United States Patent [19]

Melachouris

[11] 4,043,990

[45] Aug. 23, 1977

[54] PROCESS FOR THE RECOVERY OF WHEY PROTEIN HAVING IMPROVED SOLUTION CLARITY USING POLYPHOSPHATES

[75] Inventor: Nicholas Melachouris, Hartsdale, N.Y.

[73] Assignee: Stauffer Chemical Company, Westport, Conn.

[21] Appl. No.: 650,203

[22] Filed: Jan. 19, 1976

Related U.S. Application Data

[63] Continuation of Ser. No. 452,894, March 20, 1974, abandoned.

[51] Int. Cl.$^2$ .......................... A23C 21/00; A23J 1/20
[52] U.S. Cl. ................................. 260/112 R; 260/121; 260/122; 426/590; 426/657
[58] Field of Search .................... 260/112 R, 122, 121

[56] References Cited

U.S. PATENT DOCUMENTS 2,377,624 6/1945 Gordon ........................... 260/112 R
2,429,579 10/1947 Horvath ........................... 260/112 R

*Primary Examiner*—Howard E. Schain
*Attorney, Agent, or Firm*—Paul J. Juettner

[57] ABSTRACT

A process for recovering protein having improved solution clarity at acid pH from proteinaceous aqueous solutions comprising admixing with a proteinaceous aqueous solution a phosphate to form a phosphate complexed solution, adjusting the pH of the phosphate complexed solution to a neutral range of from about 6.0 to about 8.0 by the addition of base to form a precipitate and a pretreated proteinaceous aqueous solution, separating the precipitate from the pretreated proteinaceous aqueous solution to provide a separated precipitate and a separated pretreated proteinaceous aqueous solution, admixing with the separated pretreated proteinaceous aqueous solution a medium chain length polyphosphate to form a protein-phosphate complexed solution, adjusting the pH of the protein-phosphate complexed solution to an acid range of from about 4.5 to about 2.0 by the addition of acid to form a protein-phosphate precipitate and a supernatant solution, separating the protein-phosphate precipitate from the supernatant solution, dispersing the separated protein-phosphate precipitate in water having a final pH from about 5.0 to about 10.0 to form a protein-phosphate dispersion, contacting the protein-phosphate dispersion with an anionic ion exchange resin, and recovering the effluent containing protein. The effluent containing protein is useful for preparing fortified acidic beverages, which require protein solubility and maintenance of clear solutions at acid pH.

26 Claims, No Drawings

PROCESS FOR THE RECOVERY OF WHEY PROTEIN HAVING IMPROVED SOLUTION CLARITY USING POLYPHOSPHATES

This is a continuation of application Ser. No. 452,894, filed Mar. 20, 1974, now abandoned.

BACKGROUND OF THE INVENTION

Generally, the invention relates to a new process for the recovery of protein having improved solution clarity at acid pH from proteinaceous aqueous solutions. More particularly, the invention relates to a new process for the recovery of protein having improved solution clarity at acid pH from cheese whey and the use thereof in the fortification of acidic beverages, which require protein solubility and solution clarity at acid pH.

It is known that most food products can be nutritionally improved by protein fortification. Proteins heretofore useful for protein fortification include for example, soy protein, casein, and cheese whey proteins. Recently, it has become desirable to nutritionally improve acidic beverages by protein fortification. However, protein fortification of acidic beverages has been especially difficult, since proteins exhibit decreased solubility and increased solution turbidity at acid pH.

Recently, there has been particular interest in the use of proteins recovered from cheese whey for protein fortification of acidic beverages. This interest relates to the acid solubility of undenatured cheese whey proteins, which remain in solution at acid pH during the cheese making process.

In addition to protein solubility at acid pH, protein fortification of acidic beverages requires the maintenance of solution clarity at acid pH. Therefore, even though a particular protein exhibits adequate acid-solubility, the use thereof in acidic beverages is prohibited if the solution clarity at acid pH is unsatisfactory under the conditions of use.

Generally, it is known that protein can be recovered from proteinaceous aqueous solutions by the phosphate precipitation of protein from the proteinaceous aqueous solution and the recovered protein can be made acid-soluble by the subsequent removal of phosphate ions by conventional methods, e.g., anionic ion exchange, electrodialysis, and the like. Specifically, it is known that precipitation of protein can be effected from protenaceous aqueous solutions by metaphosphoric acid addition at acid pH. The precipitated protein can then be resolubilized by the disassociation of the protein metaphosphate complex by the addition of an alkali, and the removal of the alkali metaphosphate by precipitation or dialysis.

More specifically, the above described method is disclosed in U.S. Pat. No. 2,377,624 wherein protein is recovered in water soluble form from animal matter, as for example, whey, bovine serum and the like. The basic steps of this process comprise the addition of metaphosphoric acid or the equivalent amount of a water soluble metaphosphate, hexametaphosphate, or the like capable of yielding metaphosphoric acid; adjusting the pH within the range of 4.3 to 1.0, or preferably to about pH 3.0; separating the precipitated protein metaphosphate complex from the liquid; adding alkali to the precipitated protein metaphosphate complex to raise the pH to between about 6.0 and 12.0, preferably to about pH 9.0, to thereby disassociate the protein metaphosphate complex; and lastly the removal of metaphosphate ions by means such as dialysis, or metaphosphate precipitation.

More recently, U.S. Pat. No. 3,637,643 disclosed that the protein-phosphate precipitate can be more easily recovered by initially substantially reducing or removing the divalent metal cations present in the proteinaceous solution by ion exchange, or selective precipitation of divalent metal cations by the addition of trisodium phosphate to the proteinaceous solution. The patent also teaches that the protein recovered from the redispersed alkali solution is made acid-soluble if the phosphate ion concentration is substantially reduced. The protein thus obtained can be used in acidic beverages.

However, none of the known processes yield acid-soluble protein exhibiting solution clarity at acid pH and therefore are not suitable for use in the fortification of acidic beverages requiring solution clarity. It has been found that although the known processes provide an acid-soluble protein the protein produces turbid solutions at acid pH. These turbid acidic protein solutions are not satisfactory for the fortification of acidic beverages which require protein solubility and solution clarity at acid pH.

SUMMARY OF THE INVENTION

According to the present invention, protein having improved solution clarity at acid pH is recovered from a proteinaceous aqueous solution by a process which comprises admixing with a proteinaceous aqueous solution a phosphate selected from the group consisting of tetrasodium pyrophosphate, tetrapotassium pyrophosphate, sodium acid pyrophosphate, potassium acid pyrophosphate, potassium tripolyphosphate, sodium tripolyphosphate, ammonium tripolyphosphate, potassium tetrapolyphosphate, sodium tetrapolyphosphate, calcium pyrophosphate, magnesium pyrophosphate, sodium iron pyrophosphate, ammonium pyrophosphate and mixtures thereof, at a concentration greater than 1.0 gram per liter to form a phosphate complexed solution; adjusting the pH of the phosphate complexed solution to a range of from about 6.0 to about 8.0 by the addition of a base to form a precipitate and a pretreated proteinaceous aqueous solution; separating the precipitate from the pretreated proteinaceous aqueous solution; admixing the pretreated proteinaceous aqueous solution with a medium chain length polyphosphate of the formula:

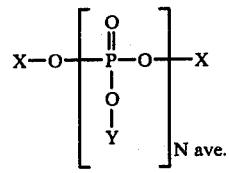

wherein X is selected from the group consisting of hydrogen and alkali metal; and Y is alkali metal; and N ave. represents an average chain length from about 3 to about 20,000 at a concentration greater than 2.0 grams per liter to form a proteinphosphate complexed solution; adjusting the pH of the proteinphosphate complexed solution to a range of from about 4.5 to about 2.0 by the addition of acid to form a protein-phosphate precipitate and a supernatant solution; separating the protein-phosphate precipitate from the supernatant solution; dispersing the separated protein-phosphate precipitate in an aqueous solution having a final pH from about 5.0 to about 12.0; contacting the proteinphosphate dispersion with an anionic ion exchange resin to remove phosphate ions from the dispersion and provide a proteinaceious effluent; and recovering the proteinaceous effluent from the anionic ion exchange resin. The process provides a protein product exhibiting improved solution clarity at acid pH, which is useful in the protein fortification of acidic beverages.

DETAILED DESCRIPTION OF THE INVENTION

The proteinaceous solution of the present invention includes protein solutions derived from animal, vegetable or cellular materials. More specifically, the proteinaceous aqueous solution includes cheese whey, or soy whey. Preferably, the proteinaceous aqueous solution is cheese whey, or reconstituted dried cheese whey.

The term cheese whey is used herein to denote sweet cheese whey comprising cheddar cheese whey, Swiss cheese whey, mozzarella cheese whey, mixtures thereof and the like. Most preferably, the proteinaceous aqueous solution useful in the present invention is cheddar cheese whey, or reconstituted cheddar cheese whey.

The process of the present invention can be operated over a broad temperature range. Temperatures above the freezing point of the aqueous solution and below the point of substantial protein denaturation can be used. Preferably, the process of the present invention is operated at a temperature between about 40° F. to about 130° F. Most preferably, the process of the present invention is operated at a temperature between about 40° F. to about 50° F., or between about 120° F. to about 130° F. in order to inhibit microbial growth during processing.

The proteinaceous aqueous solutions useful in the practice of the present invention contain dissolved protein at a concentration ranging from 2.0 grams per liter to about 100 grams per liter. The protein concentration in the aqueous solution is based on total Kjeldahl nitrogen. Protein is equal to total Kjeldahl nitrogen times the appropriate factor, for example, 6.38 in the case of milk protein and 6.25 in the case of vegetable protein determined in accordance with *Methods of Analysis - A.O.A.C.*, 16 (1970), 11th Ed.

The initial step of the process of the present invention comprises admixing with the proteinaceous aqueous solution a phosphate pretreating agent selected from the group consisting of tetrasodium pyrophosphate, tetrapotassium pyrophosphate, sodium acid pyrophosphate, potassium acid pyrophosphate, potassium tripolyphosphate, sodium tripolyphosphate, ammonium tripolyphosphate, potassium tetrapolyphosphate, sodium tetrapolyphosphate, calcium pyrophosphate, magnesium pyrophosphate, sodium iron pyrophosphate, ammonium pyrophosphate, and mixtures thereof.

The phosphate pretreating agent is admixed with the proteinaceous aqueous solution at a final pretreating agent solids concentration greater than 1.0 gram per liter to form a phosphate complexed solution. Preferably, the phosphate pretreating agent of the present invention is admixed with the proteinaceous aqueous solution at a final pretreating agent solids concentration from about 3.5 grams per liter to about 4.5 grams per liter.

In addition, further improved results can be obtained by the addition of calcium chloride to the proteinaceous aqueous solution to give a final calcium chloride solids concentration from about 0.2 grams per liter to about 4.0 grams per liter. The calcium chloride can be added to the proteinaceous aqueous solution before, during, or after the addition of the phosphate pretreating agent, but before the step of adjusting the pH to a range from about 6.0 to about 8.0. The phosphate pretreating agent of the present invention and, if added, the calcium chloride are dissolved in the proteinaceous aqueous solution by adequate stirring.

A base is added to the phosphate complexed solution. The term base is used herein to denote alkaline reacting substances, for example, sodium hydroxide, calcium hydroxide, potassium hydroxide, ammonium hydroxide, potassium carbonate, sodium carbonate, and the like. The base is added to adjust the pH to a range of from about 6.0 to about 8.0. Preferably, a base is added to adjust the pH from about 7.0 to about 8.0. The quantity of base added to the phosphate complexed solution depends upon the type of base being used.

When the base is added to the phosphate complexed solution a precipitate and a pretreated proteinaceous aqueous solution are formed. The precipitate contains reactants which if not removed at this time subsequently irreversibly combine with the protein to cause undesirable solution turbidity at acid pH. It has been found that the phosphate pretreating agent disclosed above must be added and the precipitate removed prior to the medium chain length polyphosphate addition step in order that the final product obtained by the process of the present invention exhibit solution clarity at acid pH.

The precipitate is separated from the pretreated proteinaceous aqueous solution to provide a separated precipitate and a separated pretreated proteinaceous aqueous solution. For example, the precipitate can be separated by centrifugal separation, by filtration, by settling or other means for separating solids from liquids. The separated precipitate can be dried and used in food products as a substitute for nonfat milk solids.

The separated pretreated proteinaceous aqueous solution is admixed with a medium chain length polyphosphate of the formula:

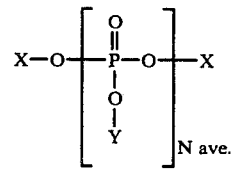

wherein X is selected from the group consisting of hydrogen and alkali metal; and Y is alkali metal; and N ave. represents an average chain length from about 3 to about 20,000. Preferably, the medium chain length polyphosphate is of the type wherein N ave. represents an average chain length from about 8 to about 14. Most preferably, the medium chain length polyphosphate is of the type wherein N ave. represents an average chain length of about 10.3.

The medium chain length polyphosphates of the present invention is usually admixed with the separated pretreated proteinaceous aqueous solution at a concentration greater than 2.0 grams per liter. Preferably, medium chain length polyphosphates of the present invention are admixed with the separated pretreated proteinaceous aqueous solution at a concentration from about 5.0 grams per liter to about 10 grams per liter.

Also, the admixture of the medium chain length polyphosphate and the separated pretreated proteinaceous aqueous solution is preferably accompanied by stirring in order to insure sufficient solubilizing of the added medium chain length polyphosphate. Stirring can be accomplished by any effective means, as for example, air injection or mechanical stirring means.

Admixing the medium chain length polyphosphate with the separated pretreated proteinaceous aqueous solution in accordance with the present invention forms a protein-phosphate complexed solution. The pH of the protein-phosphate complexed solution is adjusted by the addition of an acid to a pH in a range of from about 4.5 to about 2.0. Preferably, the acid is added in an amount to adjust the pH to a range of from about 3.0 to about 4.0.

The term acid is used herein to denote acidic reacting substances, for example, mineral, or organic acids. Specifically, mineral acids such as hydrochloric acid, sulfuric acid, phosphoric acid, or organic acids such as lactic acid, citric acid, mixtures thereof, and the like can be used herein. Preferably, food grade hydrochloric acid or phosphoric acid is used in the process of the present invention.

When the pH of the protein-phosphate complexed solution is adjusted to a range of from about 4.5 to about 2.0 a protein-phosphate precipitate and a supernatant solution are formed. The protein-phosphate precipitate forms rapidly upon pH adjustment; however, a hold time of at least 10 minutes at the acid pH range is preferred to provide sufficient time for complete protein-phosphate precipitate formation.

The protein-phosphate precipitate is separated from the supernatant solution by conventional means. For example, the protein-phosphate precipitate can be separated from the supernatant solution by centrifugal separation, by filtration, by settling or other means for separating solids from liquids. The protein concentration of the protein-phosphate precipitate can range from about 50% to about 80% (dry solids basis). Preferably, the protein content of the protein-phosphate precipitate is from about 55% to about 70% (dry solids basis). The phosphate concentration of the protein-phosphate precipitate can range from about 5% to about 25% (dry solids basis). Preferably, the phosphate concentration of the protein-phosphate precipitate is from about 10% to about 20% (dry solids basis).

The separated protein-phosphate precipitate is dispersed by adding the precipitate to water and maintaining the pH in the range of from about 5.0 to about 12.0, preferably in the range from about 5.0 to about 8.0 to thereby form a protein-phosphate dispersion. Preferably, the protein-phosphate precipitate is dispersed by stirring. Dispersion of the protein-phosphate precipitate occurs within about 10 to about 30 minutes. The protein-phosphate precipitate can be dispersed at a solids concentration from about 10 grams per liter to about 500 grams per liter. Preferably, the protein-phosphate precipitate is dispersed at a solids concentration from about 30 grams per liter to about 70 grams per liter.

The phosphate is separated from the protein-phosphate dispersion by contacting the protein-phosphate dispersion with an anionic ion exchange resin to remove phosphate ions and provide a proteinaceous effluent. The solids concentration of the protein-phosphate dispersion is maintained from about 10 grams per liter to about 100 grams per liter. Preferably, the solids content of the protein-phosphate dispersion is maintained from about 40 grams per liter to about 60 grams per liter.

By anionic ion exchange resin, it is meant herein, anion ion exchange resins capable of substantially exchanging the polyphosphate anions contained in the protein-phosphate dispersion. More specifically, the following commercially available anionic ion exchange resins are useful; Dowex 1X1, Dowex 1X2, Dowex 1X4, AMBERLITE IRA 401, and Duolite A-102D. Duolite A-102D is preferred, since this anionic exchange resin has the greatest capacity for polyphosphate anions, i.e, 1.0 to 1.1 milli equivalent polyphosphate per milliliter of resin [Nitschmann, Hs., Rickli E., and Kistler, P., Vox Sang., Volume 5, pages 232–252 (1960)].

Conventional anionic ion exchange removal of polyphosphate anions is preferably accomplished as follows. A column containing an anionic ion exchange resin of the type described above is prepared in a conventional manner. Column preparation involves placing the resin in a column having desired dimensions. The fresh resin is then washed, usually with deionized or distilled water.

The protein-phosphate dispersion can be passed through the anionic ion exchange resin at an appropriate effluent flow rate until the ion exchange capacity of the resin is exhausted. The exhausted resin can be regenerated by sequentially washing: with dilute base; with water to a pH between about 8 to 9; with a large volume of dilute solution of sodium chloride; and finally with water. Immediately after resin regeneration, the resin may again be used to remove phosphate anions from the protein-phosphate dispersion.

The proteinaceous effluent can be dried by spray drying, vacuum drying, freeze drying or other drying methods commonly used to dry proteinaceous solutions. Also the proteinaceous effluent can be concentrated by vacuum evaporative methods or other known methods commonly used to concentrate proteinaceous solutions to provide a protein concentrate. The protein concentrate can then be dried in accordance with the conventional methods.

The proteinaceous effluent exhibits solubility and unexpected solution clarity at acid pH, and can be used to fortify acidic beverages and particularly clear acidic beverages. The use of the protein of the present invention in the fortification of acidic beverages is desirable in terms of providing substantial increased nutritional benefit without adversely affecting beverage clarity or flavor.

The protein obtained in accordance with the process of the present invention can be used in acidic beverages at a protein concentration between about 2.0 grams per liter to about 30 grams per liter. Preferably, the protein of the present invention is used in acidic beverages at a protein concentration between about 10 grams per liter to about 20 grams per liter.

The process of the present invention is further illustrated in the examples set forth below.

EXAMPLE 1

To 100 milliliters of defatted cheddar cheese whey having a pH of 6.0 was admixed sodium and pyrophosphate at a concentration of 40 grams per liter, as 5 milliliters of an 80 grams per liter stock solution, to form a phosphate complexed solution. The pH of the phosphate complexed solution was then adjusted to 7.5 by the addition of sodium hydroxide to form a precipitate and a pretreated cheese whey solution. The precipitate formed upon base addition was separated from the pretreated cheese whey solution by gravity filtration through number 541 Whatman Filter Paper to give a separated precipitate and a separated pretreated cheese whey solution. To the separated pretreated cheese whey solution was admixed sodium polyphosphate (N ave. = 10.3) at a concentration of 10 grams per liter to form a protein-phosphate complexed solution. The protein-phosphate complexed solution was stirred and the pH adjusted to 3.5 by the addition of hydrochloric acid to form a protein-phosphate precipitate and a supernatant solution. The protein-phosphate precipitate was separated from the supernatant solution by gravity filtration through number 541 Whatman Filter Paper. The separated protein-phosphate precipitate was dispersed by stirring the precipitate in 50 milliliters of water having a pH of 7.5 to form a protein-phosphate dispersion. The protein-phosphate dispersion was contacted with an anionic ion exchange resin, commercially available under under the tradename DUOLITE A-102D from Diamond Shamrock Chemical Co., to provide a whey protein effluent. The ion exchange column was 22 centimeters high and 1.5 centimeters in diameter and contained 28.4 grams of the dry resin. The anionic ion exchange resin was in the chloride form. The total volume of feed material was contacted with the ion exchange resin and the whey protein effluent collected at a flow rate of 36 ml./hr./cm$^2$. The whey protein effluent was dried by freeze drying. The dried sample was used for further testing.

The freeze dried sample was assayed for protein in accordance with conventional methods (% N × 6.38): *Methods of Analysis* - A.O.A.C., 16, (1970) 11th Ed. The protein concentration of the freeze dried sample was 66.7% (dry solids basis) and is shown in Table I. The solution clarity of the freeze dried sample was determined by first redissolving the freeze dried sample at a protein concentration of 10 grams per liter and adjusting the pH to 3.0 by the addition of acid. The light transmittance of the solution was determined at 625 millimicrons on a Beckman DBG spectrophotometer. The light transmittance of the solution was 71.0% and is shown in Table I.

EXAMPLE 2

To a 100 milliliters of defatted cheddar cheese whey was admixed a sodium polyphosphate (N ave. = 10.3) at a concentration of 10 grams per liter to form a protein-phosphate complexed solution. The protein-phosphate solution was thereafter treated as described in Example 1 by dispersing the the precipitate in water, contacting the dispersion with the anionic ion exchange resin, and recovering the whey protein effluent. The freeze dried sample was assayed for protein as described in Example 1 and the results shown in Table I. The light transmittance of this sample, determined as described in Example 1, was 0.9% and is presented in Table I.

It is apparent from the data shown in Table I relating to Examples 1 and 2 that a substantial increase in solution clarity at acid pH is obtained by treating cheddar cheese whey in accordance with the process of the present invention.

EXAMPLE 3

To 100 milliliters of defatted cheddar cheese whey having an initial pH of 6.1 was admixed sodium acid pyrophosphate at a concentration of 4.0 grams per liter, as 5 milliliters of an 80 grams per liter stock solution, to form a phosphate complexed solution. In addition, calcium chloride was admixed with the phosphate complexed solution at a concentration of 1.2 grams per liter, as 1.5 milliliters of an 0 grams per liter stock solution. The pH of the phosphate complexed solution was adjusted to 7.04 by the addition of sodium hydroxide to form a precipitate and a pretreated cheese whey solution. The remaining steps were as those described in Example 1.

A protein solution having a protein concentration of 10 grams per liter and a pH of 3.0 was prepared in accordance with Example 1. The light transmittance of this protein solution was 77.3% and is presented in Table I.

It is clear from Examples 2 and 3 in Table I that pretreatment in accordance with the present invention by calcium chloride solution addition provides an increase in the solution clarity of the whey protein solution at pH 3.0.

EXAMPLE 4

To 100 milliliters of defatted cheddar cheese whey having a pH of 6.0 was admixed potassium tripolyphosphate at a concentration of 4.0 grams per liter, as 5 milliliters of an 80 grams per liter stock solution, to form a phosphate complexed solution. The pH of the phosphate complexed solution was adjusted to 7.5 by the addition of sodium hydroxide to form a precipitate and a pretreated cheese whey solution. The remaining steps were as described in Example 1.

The freeze dried cheese whey protein was dissolved in water at a protein concentration of 10 grams per liter. The pH was then adjusted to 3.0 as previously described in Example 1. The light transmittance at 625 millimicrons of the protein solution, determined as previously described, was 43.2% and is shown in Table I.

EXAMPLE 5

To 100 milliliters of defatted cheddar cheese whey having a pH of 6.0 was admixed potassium tripolyphosphate at a concentration of 4.0 grams per liter, as 5 milliliters of an 80 grams per liter stock solution, to form a phosphate complexed solution. In addition, calcium chloride was admixed with the phosphate complexed solution at a concentration of 1.2 grams per liter, as 1.5 milliliters of an 80 grams per liter stock solution. The pH of the phosphate complexed solution was adjusted to 7.5 by the addition of sodium hydroxide to form a precipitate and a pretreated cheese whey solution. The remaining steps were as described in Example 1.

The freeze dried protein was dissolved in water at a protein concentration of 10 grams per liter. The pH was then adjusted to 3.0 as previously described. The light transmittance of this solution was 71.9% as determined in accordance with the method described in Example 1 and is shown in Table I.

EXAMPLE 6

To 100 milliliters of defatted cheddar cheese whey having a pH of 6.0 there was admixed tetrasodium pyrophosphate at a concentration at 4.5 grams per liter, as 15 milliliters of a 30 grams per liter stock solution, to thereby form a phosphate complexed solution. In addition, calcium chloride was admixed with the phosphate complexed solution at a concentration of 2.8 grams per liter, as 3.5 milliliters of a 80 grams per liter stock solution. The pH of the phosphate complexed solution was adjusted to 7.07 by the addition of sodium hydroxide. The remaining steps were as described in Example 1.

The light transmittance of a solution of the freeze dried protein was determined by dissolving the dried protein in water at a protein concentration of 10 grams per liter. The pH was then adjusted to about 3.0 by the addition of acid. The light transmittance of whey protein solution was 69.7% and is shown in Table I.

It is clear from Examples 2, 4, 5, and 6 in Table I that pretreatment with the phosphates of the present invention are effective in terms of providing protein solutions exhibiting improved solution clarity at pH 3.0.

crons was 11.5% determined as previously described in Example 1 and is shown in Table II.

EXAMPLE 8

To 100 milliliters of cheddar cheese whey obtained as described in Example 7, was admixed sodium polyphosphate (N ave. = 10.3) at a concentration of 10 grams per liter to form a protein-phosphate solution. The protein-phosphate solution was thereafter treated as described in Example 7. The whey protein effluent was freeze dried. The freeze dried whey protein was dissolved in water at a protein concentration of 10 grams

TABLE I

| Example No. | | Example No. | Protein (N × 6.38) Concentration % (Dry Solids Basis) | % Transmittance at 625 millimicrons (Protein Solution, 10 g/l at pH 3.0) |
|---|---|---|---|---|
| 1 | Pretreat: | phosphate, 4 g/l (SAPP)¹ | 66.7 | 71.0 |
| 2 | Control: | no pretreatment | 64.9 | 0.9 |
| 3 | Pretreat: | phosphate, 4 g/l (SAPP, CaCl₂) | 64.9 | 77.3 |
| 4 | " | (PTTP)² | 66.5 | 43.2 |
| 5 | " | (PTPP, CaCl₂) | 66.3 | 71.9 |
| 6 | " | 4.5 g/l (TSPP³,CaCl₂) | 68.1 | 69.7 |

¹(SAPP) is sodium acid pyrophosphate
²(PTPP) is potassium tripolyphosphate
³(TSPP) is tetrasodium pyrophosphate Examples 7–10 show the effect of substantially lower phosphate pretreating agent concentrations on the solution clarity of the whey protein solutions prepared in accordance with the procedures previously described at pH 6.0 and at pH 3.0.

EXAMPLE 7

To 100 milliliters of cheddar cheese whey obtained by reconstituting 6.5 grams of commercially available spray dried cheddar cheese whey in 100 milliliters of water, was admixed potassium tripolyphosphate at a concentration of 1.0 gram per liter, as 1.25 milliliters of an 80 grams per liter stock solution, to form a phosphate complexed solution. The pH of the phosphate complexed solution was adjusted to 7.5 by the addition of sodium hydroxide to form a precipitate and a pretreated cheese whey solution. The precipitate was separated from the second cheese whey solution by gravity filtration through a number 541 Whatman Filter Paper to give a separated precipitate and a separated pretreated cheese whey solution. To the separated pretreated cheese whey solution, there was admixed sodium polyphosphate (N ave. = 10.3) at a concentration of about 10 grams per liter to form a protein-phosphate complexed solution. The protein-phosphate complexed solution was stirred and the pH adjusted to 3.5 by the addition of hydrochloric acid to form a protein-phosphate precipitate and a supernatant solution. The protein-phosphate precipitate was separated from the supernatant solution by centrifugation at 2500 rpm in an International Centrifuge for 25 minutes. The remaining steps were as described in Example I.

The whey protein effluent was freeze dried as previously described in Example 1. The freeze dried whey protein was dissolved in water at a protein concentration of 10 grams per liter. The pH of the whey protein solution was adjusted to 6.0 by the addition of hydrochloric acid. The solution clarity of the solution at pH 6.0 was determined, as previously described, by measuring the percent light transmittance of the whey protein solution, and is presented in Table II.

The pH of the whey protein solution was adjusted to 3.0 as described in Example 1. The percent light transmittance of the whey protein solution at 625 millimicrons was 11.5% determined as previously described in Example 1 and is shown in Table II.

per liter. The pH of the whey protein solution was adjusted to 6.0 and the solution clarity determined as described in Example 7, and is presented in Table II. The pH was then adjusted to 3.0 as described in Example 1. The solution clarity of the whey protein solution at pH 3.0 as indicated by the percent transmittance at 625 millimicrons was 0, determined as previously described in Example 1 and is shown in Table II.

It is clear from Examples 7 and 8 in Table II that pretreatment with the phosphate pretreating agent at a substantially reduced concentration provides a protein solution with improved solution clarity at pH 3.0.

EXAMPLE 9

To 100 milliliters of cheddar cheese whey obtained as described in Example 7, having a pH of 6.0, was admixed potassium tripolyphosphate at a concentration of 1.0 gram per liter, to form a phosphate complexed solution. In addition, calcium chloride was admixed with the phosphate complexed solution at a concentration of 0.3 grams per liter, as 0.375 milliliters of an 80 grams per liter stock solution. The pH of the phosphate complexed solution was adjusted to 7.5 by the addition of sodium hydroxide. The phosphate complexed solution was treated as described in Example 7. The solution clarity of the whey protein solution at pH 6.0 and pH 3.0, as indicated by percent transmittance at 625 millimicrons, were 8.3 and 18.0, respectively. The solution clarities of the whey protein solutions were determined as previously described in Example 1 and are presented in Table II. It is clear from Examples 7 and 9 that improved solution clarity is obtained at both pH 6.0 and pH 3.0 by the optional addition of calcium chloride to the phosphate complexed solution.

EXAMPLE 10

To 100 milliliters of cheddar cheese whey obtained as described in Example 7, was admixed potassium tripolyphosphate at a concentration of 4.0 grams per liter, as 5 millimeters of an 80 grams per liter stock solution, to form a phosphate complexed solution. The remaining steps were as those described in Example 7.

The solution clarity of the whey protein solution at pH 6.0 and pH 3.0, as indicated by the percent transmittance at 625 millimicrons, were 64.5% and 66.2%, respectively. The solution clarities of the whey solutions were determined as previously described in Example 1 and are presented in Table II. It is clear from Examples 7, 8, and 9 of Table II that substantially improved results are obtained with the phosphate pretreating agent concentrations in the range of 4.0 grams per liter.

The freeze dried treated whey protein and the untreated whey protein product were dissolved in water at a protein concentration of 10 grams per liter. The pH of the whey protein solutions were adjusted to 3.0 as previously described in Example 1. The solution clarities of the whey protein solutions at pH 3.0, as indicated by percent light transmittance, at 625 millimicrons, were 38.8%, for the treated whey protein product and not calculable for the untreated whey protein product.

TABLE II

| Example No. | Example No. | | % Transmittance at 625 Millimicrons | |
|---|---|---|---|---|
| | | | (Protein Solution, 10 g/l) at pH 6.0 | (Protein Solution, 10 g/l) at pH 3.0 |
| 7 | Pretreat: | phosphate, 1 g/l (PTPP)[1] | 8.0 | 11.5 |
| 8 | Control: | no pretreatment | 0 | 0 |
| 9 | Pretreat: | phosphate, 1 g/l (PTPP, CaCl$_2$) | 8.3 | 18.0 |
| 10 | " | 4 g/l (PTPP) | 64.5 | 66.2 |

[1] (PTPP) is potassium tripolyphosphate

Examples 11–13 show the effect of phosphate removal on the protein concentration, phosphorus concentration, and the solution clarity at pH 3.0 of the whey protein obtained in accordance with the present invention (Examples 11 and 13) compared to the control samples (Example 12).

EXAMPLE 11

To 700 milliliters of defatted cheese whey at a temperature of 125° F. was admixed sodium acid pyrophosphate at a concentration of 4.0 grams per liter, as 35 milliliters of 80 grams per liter stock solution, to form a phosphate complexed solution. The pH of the phosphate complexed solution was adjusted to 7.5 by the addition of sodium hydroxide to form a precipitate and a pretreated cheese whey solution. The precipitate was separated from the pretreated cheese whey solution by gravity filtration as previously described in Example 1 to give a separated precipitate and a separated pretreated cheese whey solution.

To the separated second cheese whey solution, heated to 125° F., was admixed sodium polyphosphate (N ave. = 10.3) at a concentration of 9.0 grams per liter to form a protein-phosphate complexed solution. The pH of the protein-phosphate complexed solution was adjusted to 3.5 by the addition of hydrochloric acid to form a protein-phosphate precipitate and a supernatant solution.

The protein-phosphate precipitate was separated from the supernatant solution by filtration through number 541 Whatman Filter Paper. The separated protein-phosphate precipitate was dispersed in 100 milliliters of water by stirring the separated protein-phosphate precipitate in the water having a pH of 7.0 to form a protein-phosphate dispersion. 50 milliliters of the protein-phosphate dispersion was passed through an anionic ion exchange resin and freeze dried as described in Example 1. The remaining 50 milliliters of the protein-phosphate dispersion was freeze dried without phosphate removal.

The protein concentrations of the treated whey protein product (phosphate removed) and the untreated whey protein product were determined in accordance with: Methods of Analysis, A.O.A.C., 16, (1970) 11th Ed., and are presented in Table III. Also, the phosphorus concentration of the treated whey protein product and the untreated whey protein product were determined in accordance with Method of Analysis - A.O.A.C., 2.016, (1965) 10th Ed. and are presented in Table III.

The solution clarities were determined as previously described in Example 1, and are shown in Table III.

EXAMPLE 12

To 390 milliliters of defatted cheddar cheese whey obtained as described in Example 11, at a temperature of 125° F., sodium polyphosphate (N ave. = 10.3) at a concentration of 9.0 grams per liter to form a protein-phosphate complexed solution. The protein-phosphate complexed solution was thereafter treated as described in Example 11. The protein concentrations, and phosphate concentrations of the treated and untreated whey protein products were determined as described in Example 11, and are presented in Table III. The solution clarities of the whey protein solutions, i.e., treated and untreated, at pH 3.0, as indicated by the percent transmittance at 625 millimicrons were 1.3%, (treated), and not calculable (untreated) determined as previously described in Example 1, and are shown in Table III.

It is clear from Examples 11 and 12 that pretreatment of cheese whey by the addition of the phosphate combined with phosphate removal provides whey protein products with increased protein concentration, reduced phosphate concentration, and substantially improved solution clarity at acid pH (pH 3.0).

Example 13 shows the effect of pretreatment by the addition of the phosphate pretreating agent and the calcium chloride to provide improved results.

EXAMPLE 13

To 700 milliliters of defatted cheddar cheese whey at a temperature of 125° F. was admixed sodium acid pyrophosphate at a concentration of 4.0 grams per liter, as 35 milliliters of an 80 grams per liter stock solution, to form a phosphate complexed solution. In addition, calcium chloride was admixed with the phosphate complexed solution at a concentration of 1.14 grams per liter, as 10 milliliters of an 80 grams per liter stock solution. The pH of the phosphate complexed solution was adjusted to 7.0 by the addition of sodium hydroxide. The phosphate complexed solution was thereafter treated as described in Example 11.

The separated protein-phosphate precipitate was dispersed in 250 milliliters of water by stirring the separated protein-phosphate precipitate in the water having a pH of about 7.0 to form a protein-phosphate dispersion. 125 milliliters of the protein-phosphate dispersion were passed through an anionic ion exchange resin and the effluent freeze dried, as previously described in Example 1.

The protein and phosphate concentrations of the treated and untreated whey protein products were determined as previously described in Example 11, and are presented in Table III. The freeze dried, treated and untreated, whey protein were products dissolved in water at a protein concentration of 10 grams per liter. The pH was adjusted to 3.0 as previously described in Example 1. The solution clarities of the whey protein solutions at pH 3.0, as indicated by the percent light transmittance at 625 millimicrons were 77.3%, (treated) and not calculable (untreated) determined as previously described in Example 1, and are disclosed in Table III.

TABLE III

| Example No. | Example No. | Dry (Solids Basis) Protein % | | Dry (Solids Basis) Phosphorus % | | % Transmittance at 625 Millimicrons of 2 Protein Solution (10 g/l) at pH 3.0 | |
|---|---|---|---|---|---|---|---|
| | | Before Phosphate Removal | After Phosphate Removal | Before Phosphate Removal | After Phosphate Removal | Before Phosphate Removal | After Phosphate Removal |
| 11 | Pretreat: phosphate, 4 g/l (SAPP)[1] | 67.9 | 74.5 | 4.2 | 0.18 | NC* | 38.8 |
| 12 | Control: no pretreatment | 57.5 | 63.5 | 4.8 | 0.16 | NC* | 1.3 |
| 13 | Pretreat: phosphate, 4 g/l (SAPP, CaCl$_2$) | 63.1 | 69.8 | 4.2 | 0.17 | NC* | 77.3 |

*Not calculable due to precipitate formation
[1](SAPP) is sodium acid pyrophosphate.

What is claimed is:

1. In a process for the recovery of protein having improved solution clarity at acid pH from a proteinaceous aqueous solution containing whey protein in which a medium chain length polyphosphate of the formula:

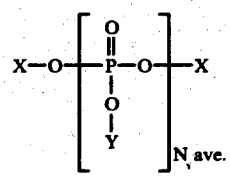

wherein X is selected from the group consisting of proteinaceous and alkali metal; and Y is alkali metal; and N ave. represents an average chain length from about 3 to about 20,000, is admixed with a proteinaceous aqueous solution containing whey protein to form a protein-phosphate complexed solution; and the pH of said protein-phosphate complexed solution is adjusted to a range of from about 4.5 to about 2.0 to form a protein-phosphate precipitate, the protein-phosphate precipitate is separated from said mineral solution and dispersed in an aqueous solution having a final pH from about 5.0 to about 12.0 and the protein-phosphate dispersion is contacted with an anionic ion exchange resin to remove phosphate from said dispersion and provide a protein-aqueous effluent; the improvement which consists essentially of pretreating said proteinaceous aqueous solution containing whey protein prior to subjecting said proteinaceous aqueous solution containing whey protein to the process outlined in the preamble which pretreatment consists essentially of the steps of:

a. admixing with said proteinaceous aqueous solution containing whey protein a phosphate selected from the group consisting of tetrasodium pyrophosphate, tetrapotassium pyrophosphate, sodium acid pyrophosphate, potassium acid pyrophosphate, potassium tripolyphosphate, sodium tripolyphosphate, calcium pyrophosphate, magnesium pyrophosphate, ammonium pyrophosphate, or mixtures thereof at a concentration greater than 1.0 gram per liter to thereby form a phosphate complexed solution;

b. adjusting the pH of said phosphate complexed solution to a neutral range of from about 6.0 to about 8.0 by the addition of a base to a level of base sufficient to form a precipitate and a pretreated proteinaceous aqueous solution containing whey protein;

c. separating said precipitate from said pretreated proteinaceous aqueous solution containing whey protein to give a separated precipitate and a separated pretreated proteinaceous aqueous solution containing whey protein; and d. recovering the protein from said pretreated proteinaceous aqueous solution containing whey protein using said process, said protein having improved solution clarity at acid pH.

2. The process of claim 1 wherein said proteinaceous aqueous solution is cheese whey.

3. The process of claim 2 wherein said cheese whey is reconstituted dried cheese whey.

4. The process of claim 2 wherein said cheese whey is sweet cheese whey.

5. The process of claim 4 wherein said sweet cheese whey is selected from the group consisting of cheddar cheese whey, Swiss cheese whey, mozzarella cheese whey, or mixtures thereof.

6. The process of claim 1 which further includes admixing calcium chloride with said proteinaceous aqueous solution at a concentration from about 0.2 grams per liter to about 4.0 grams per liter.

7. The process of claim 6 wherein said proteinaceous aqueous solution is cheddar cheese whey, said phosphate is tetrasodium pyrophosphate, and said medium chain length polyphosphate is sodium hexametaphosphate.

8. The process of claim 6 wherein said proteinaceous aqueous solution is cheddar cheese whey, said phosphate is sodium acid pyrophosphate and said medium chain length polyphosphate is sodium hexametaphosphate.

9. The process of claim 6 wherein said proteinaceous aqueous solution is cheddar cheese whey, said phosphate is potassium tripolyphosphate, and said medium chain length polyphosphate is sodium hexametaphosphate.

10. The process of claim 1 wherein said proteinaceous aqueous solution is cheddar cheese whey, said phosphate is sodium acid pyrophosphate, and said medium chain length polyphosphate is sodium hexametaphosphate.

11. The process of claim 1 wherein said proteinaceous aqueous solution is cheddar cheese whey, said phosphate is potassium tripolyphosphate, and said medium chain length polyphosphate is sodium hexametaphosphate.

12. A process for the recovery of protein having improved solution clarity at acid pH from a proteinaceous aqueous solution containing whey protein consisting essentially of:
 a. admixing with a proteinaceous aqueous solution containing whey protein a phosphate selected from the group consisting of tetrasodium pyrophosphate, tetrapotassium pyrophosphate, sodium acid pyrophosphate, potassium acid pyrophosphate, potassium tripolyphosphate, sodium tripolyphosphate, ammonium tripolyphosphate, potassium tetrapolyphosphate, sodium tetrapolyphosphate, calcium pyrophosphate, magnesium pyrophosphate, ammonium pyrophosphate, sodium iron pyrophosphate, or mixtures thereof at a concentration greater than 1.0 gram per liter to form a phosphate complexed solution;
 b. adjusting the pH of said phosphate complexed solution to a neutral range of from about 6.5 to about 8.0 by the addition of a base to a level of base sufficient to form a precipitate and a pretreated proteinaceous aqueous solution containing whey protein;
 c. separating said precipitate from said pretreated proteinaceous aqueous solution to give a separated precipitated and a separated pretreated proteinaceous aqueous solution containing whey protein;
 d. admixing said separated pretreated proteinaceous aqueous solution containing whey protein with a medium chain length polyphosphate of the formula:

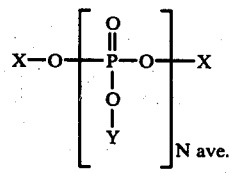

wherein X is selected from the group consisting of hydrogen and alkali metal; and Y is alkali metal; and N ave. represents an average chain length from about 8 to about 14 at a concentration greater than 2.0 grams per liter to form a protein-phosphate complexed solution;
 e. adjusting the pH of said protein-phosphate complexed solution containing whey protein to an acid range of from about 4.5 to about 2.0 by the addition of acid to form a protein-phosphate precipitate and a mineral solution;
 f. separating said protein-phosphate precipitate from said mineral solution;
 g. dispersing said separated protein-phosphate precipitate in an aqueous solution having a final pH from about 5.0 to about 8.0 to form a protein-phosphate dispersion;
 h. contacting said protein-phosphate dispersion with an anionic ion exchange resin to remove ionic phosphate from said dispersion and provide a proteinaceous effluent; and
 i. recovering said proteinaceous effluent from said anionic ion exchange resin.

13. The process of claim 12 wherein said proteinaceous aqueous solution is cheese whey.

14. The process of claim 13 wherein said cheese whey is reconstituted dried cheese whey.

15. The process of claim 13 wherein said cheese whey is sweet cheese whey.

16. The process of claim 15 wherein said sweet cheese whey is selected from the group consisting of cheddar cheese whey, Swiss cheese whey, mozzarella cheese whey, or mixtures thereof.

17. The process of claim 12 which further includes admixing calcium chloride with said protein containing aqueous solution at a concentration from about 0.2 grams per liter to about 4.0 grams per liter.

18. The process of claim 17 wherein said proteinaceous aqueous solution is cheddar cheese whey, said phosphate is tetrasodium pyrophosphate, and said medium chain length polyphosphate is sodium hexametaphosphate.

19. The process of claim 17 wherein said proteinaceous aqueous solution is cheddar cheese whey, said phosphate is sodium acid pyrophosphate, and said medium chain length polyphosphate is sodium hexametaphosphate.

20. The process of claim 17 wherein said proteinaceos aqueous solution is cheddar cheese whey, said phosphate is potassium tripolyphosphate, and said medium chain length polyphosphate is sodium hexametaphosphate.

21. The process of claim 12 wherein said proteinaceous aqueous solution is cheddar cheese whey, said phosphate is sodium acid pyrophosphate, and said medium chain length polyphosphate is sodium hexametaphosphate.

22. The process of claim 12 wherein said proteinaceous aqueous solution is cheddar cheese whey, said phosphate is potassium tripolyphosphate, and said medium chain length polyphosphate is sodium hexametaphosphate.

23. The product of the process of claim 1.

24. The product of the process of claim 12.

25. The process of claim 1 wherein the pH of step (b) is from pH 7 to pH 8.

26. The process of claim 12 wherein the pH of step (b) is from pH 7 to pH 8.

UNITED STATES PATENT AND TRADEMARK OFFICE
CERTIFICATE OF CORRECTION

PATENT NO. : 4,043,990

DATED : August 23, 1977

INVENTOR(S) : Nicholas Melachouris

It is certified that error appears in the above-identified patent and that said Letters Patent are hereby corrected as shown below:

Column 5, line 4, please delete "solubilizing" and insert -- solubilization --;

Column 6, line 63, please delete "and" and insert -- acid --;

Column 8, line 5, please "0 grams per liter" and insert -- 80 grams per liter --;

In the Claims: Claim 1, Column 13, lines 44-45, please delete "proteinaceous" and insert -- hydrogen --.

*Signed and Sealed this*

*Twenty-seventh* Day of *December 1977*

[SEAL]

Attest:

RUTH C. MASON
*Attesting Officer*

LUTRELLE F. PARKER
*Acting Commissioner of Patents and Trademarks*